United States Patent
Manroa

(10) Patent No.: US 8,229,461 B1
(45) Date of Patent: Jul. 24, 2012

(54) SYSTEM AND METHOD FOR OPERATING A LOCATION SERVER

(75) Inventor: Arun Manroa, Herndon, VA (US)

(73) Assignee: Nextel Communications, Inc., Reston, VA (US)

(*) Notice: Subject to any disclaimer, the term of this patent is extended or adjusted under 35 U.S.C. 154(b) by 246 days.

(21) Appl. No.: 12/621,081

(22) Filed: Nov. 18, 2009

(51) Int. Cl.
*H04W 24/00* (2009.01)

(52) U.S. Cl. .................. 455/456.1; 455/414.2; 719/328

(58) Field of Classification Search ............... 455/432.1, 455/432.3, 433, 435.1, 440, 456.1, 456.2, 455/457, 461, 41.2; 340/426; 701/200–203, 701/213
See application file for complete search history.

(56) References Cited

U.S. PATENT DOCUMENTS

| | | | | |
|---|---|---|---|---|
| 2003/0222819 | A1* | 12/2003 | Karr et al. | 342/457 |
| 2007/0123272 | A1* | 5/2007 | Ida et al. | 455/456.1 |
| 2007/0291725 | A1* | 12/2007 | Kowalski | 370/338 |
| 2009/0106778 | A1* | 4/2009 | Pomeroy et al. | 719/328 |
| 2009/0325598 | A1* | 12/2009 | Guigne et al. | 455/456.1 |

* cited by examiner

*Primary Examiner* — Kamran Afshar
*Assistant Examiner* — Kenneth Corbin

(57) ABSTRACT

A method and a system for providing location information are provided. A location server receives a request for location information for the mobile station. The request includes an identifier for the mobile station. The location server determines whether the mobile station is at an enclosing location object by searching a location server database in response to the request. When the location server determines that the mobile station is at the enclosing location object, the location server obtains the enclosing location object from the location server database independent of a location request being sent to the mobile station, and provides the enclosing location object as the location of the mobile station. A sensor can be used to determine whether the mobile station is at the enclosing location object, and the location server database can be updated based on the sensor information.

18 Claims, 6 Drawing Sheets

| ID | Active | Enclosing Location Object Identifier | Enclosing Location Object Type | Position for Enclosing Location Object | Mobile Station Identifier | Opt-In |
|---|---|---|---|---|---|---|
| 01 | Yes | Chrysler Building | Building | 73.97W by Lat 40.75N | 10000000000001 | Yes |
| 02 | Yes | Greyhound 12345 | Bus | Movable | 11-11111-111111-22 | Yes |
| 03 | No | Delta Flight 703 | Air Flight | | 10000000000001 | Yes |
| 04 | Yes | Penn Central Station, MI | Stationary | 2405 W. Vernor St Detroit MI | 10000000000001 | No |

SYSTEM AND METHOD FOR OPERATING A LOCATION SERVER

BACKGROUND OF THE INVENTION

Wireless communication networks typically track the location of mobile stations within the network on the cell level. This tracking allows the network to route incoming calls to the cell in which the mobile station is currently located. Furthermore, in order to comply with Federal Communication Commission (FCC) regulations for emergency 911 (E911) calls, many wireless communication networks can provide the latitude and longitude of a mobile station to a public safety answering point (PSAP).

The capability to determine the location of a mobile station can be exploited deliver information to mobile phone users customized to a specific user location. Information services can determine the location of specific mobile stations by sending a "ping" message to the mobile station. In response to the ping message, the mobile station may determine its location using any of a number of methods and then may report the mobile stations location in response to the ping request. For example, the mobile station may include a global positioning system (GPS) chip that receives information from a constellation of satellites and computes a triangulated position based on the satellite information. Alternatively, the mobile station may compute a triangulated position based on information received from three or more base transceiver stations (BTS) in a cellular network providing communications for the mobile station.

SUMMARY OF THE INVENTION

It has been recognized that the conventional location determining and providing techniques suffer from a number of deficiencies. For example, the query and response messages exchanged between the network and the mobile station can consume anywhere from 3-5 seconds to determine the location of the mobile station. When large numbers of mobile stations are at given location, the location servers may be served by the same base transceiver station in a single cell of a mobile network. If an application server requests location information for large numbers of mobile stations at a single location directly from the mobile stations, transmitting the requests between the base transceiver station and the mobile stations may consume all of the radio frequency (RF) resources within the cell. The result may be that there are no resources available to support other communication services for the users in the cell. Even if an individual user does not use the location service, the consumption of resources by pings to other mobile stations may prevent the user from reaching the mobile network to obtain communication services. Furthermore, these location requests can consume a large amount of resources of the location server when the mobile stations have a relatively static position.

In other situations, it may simply be undesirable to allow the mobile stations at a location to generate radio transmissions. For example users may be required to deactivate their mobile phones during a flight on a commercial airliner or while attending a meeting.

Exemplary embodiments of the present invention overcome the above-identified and other deficiencies of conventional location determining and providing techniques. An exemplary method involves receiving an output from a sensor associated with an enclosing location object arranged to detect that the a mobile station is present at the enclosing location object; updating a database based on the received output with correlation information that identifies a mobile station as present at an enclosing location object associated with the sensor; receiving, by a location server, a request for location information for the mobile station; determining whether the mobile station is at the enclosing location object at the time of receiving the request by searching the database in response to the request; and upon a determination that the mobile station is at the enclosing location object, generating location information that provides a location of the enclosing location object as location information for the mobile station Another exemplary method involves detecting the presence of a mobile station using a sensor at an enclosing location object; storing in a memory at the enclosing location object, information that identifies the mobile station as being at the enclosing location object; and transmitting a command that stores a correlation of an identifier for the mobile station and information describing the enclosing location object at a location server.

Other objects, advantages and novel features of the present invention will become apparent from the following detailed description of the invention when considered in conjunction with the accompanying drawings.

BRIEF DESCRIPTION OF THE DRAWING FIGURES

FIG. 6 illustrates an example database table for use with the present invention.

DETAILED DESCRIPTION OF THE ILLUSTRATED EMBODIMENTS

Figure 1:
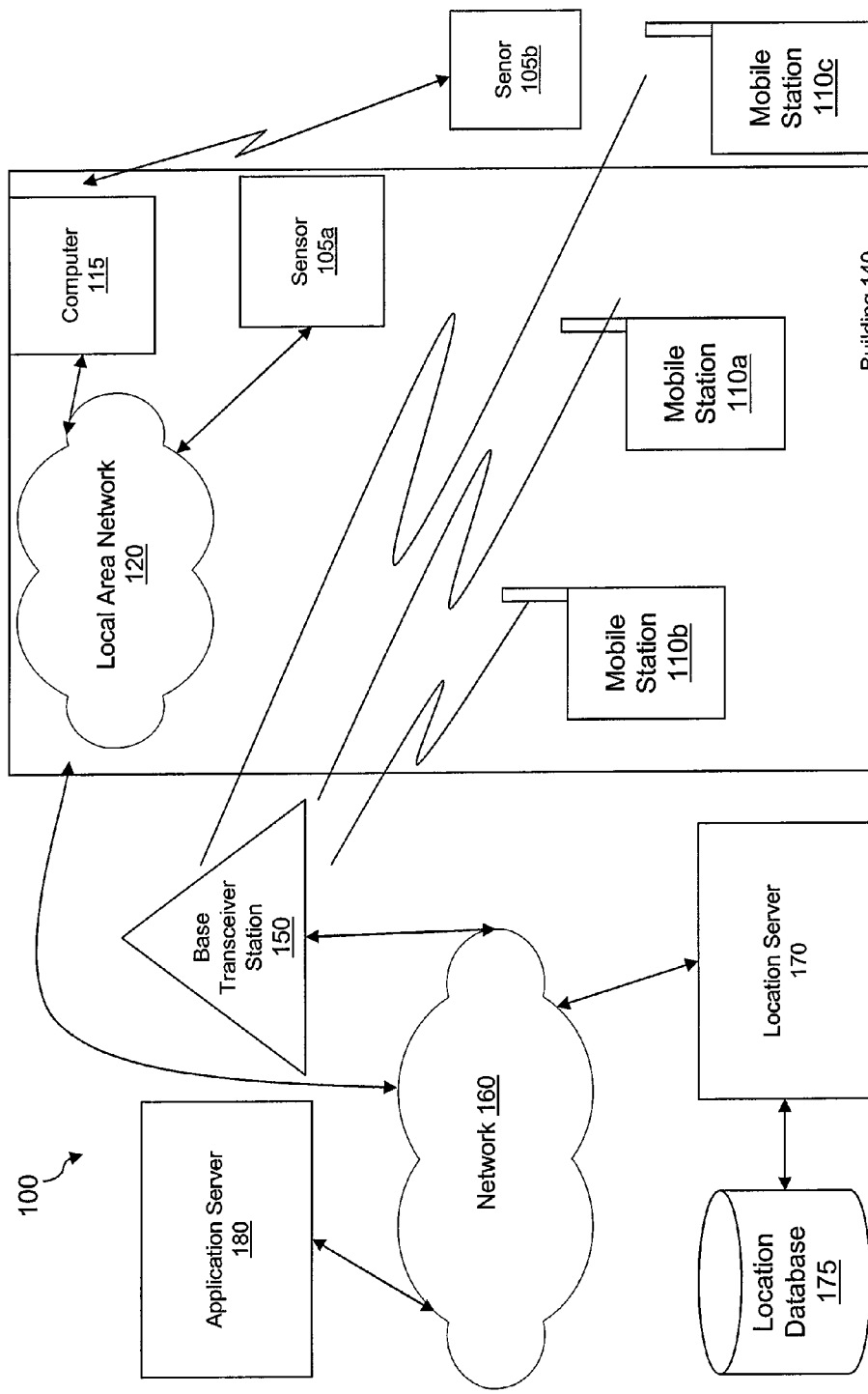
FIG. 1 is a block diagram of an exemplary location server system in accordance with the present invention.

FIG. 1 is a block diagram of an exemplary location server system 100 in accordance with the present invention. The system includes a network 160 that couples mobile stations 110a, 110b, and 110c to a location server 170 and an application server 180 in order to support the delivery of application based services to the mobile stations 110a, 110b, and 110c.

Mobile stations 110a and 110b are located within building 140, while mobile station 110c is outside of building 140. The mobile stations 110a, 110b, and 110c are each in wireless communication with a base transceiver station (BTS) 150. The mobile stations 110a, 110b, and 110c are devices for transmitting and receiving wireless communications and may be devices such as mobile phones, personal digital assistants (PDAs), wireless terminals or the like.

Any identifier that may be correlated with a mobile station or a mobile station subscriber may be used as the mobile station identifier. For example, a mobile station may have an International Mobile Subscriber Identity (IMSI) number stored in a memory area such as Subscriber Identity Module (SIM) within the mobile station. The IMSI can be used as the mobile station identifier by the location server system. Alternatively, the location server system may use the International Mobile Equipment Identity (IMEI) number as the mobile station identifier. The IMEI is assigned to a mobile device rather than to a specific subscriber.

Base transceiver station 150 is part of the infrastructure that supports telecommunications with the mobile stations. Base transceiver station 150 is connected to the location server 170 via network 160. The base transceiver station 150 connects the mobile station to a switching system such as a public switched telephone network via network 160 to provide communication services for mobile stations. Although FIG. 1 shows a single base transceiver station 150 supporting all three mobile stations 110a, 110b, and 110c, multiple base transceiver stations may be used provided that the base transceiver stations are in communication with the location server. For example, mobile station 110c located outside of building 140 may be supported by a base transceiver station distinct from base transceiver station 150.

Location server 170 is coupled to location server database 175. The location server 170 implements logic for determining and supplying the location of mobile stations in response to received requests. The location server database 175 stores location information obtained by the location server. Although FIG. 1 illustrates location server 170 and location server database 175 as separate network elements, these can be combined into a single element.

Application server 180 implements logic for delivering information services to the mobile stations. The location server 170 and the application server 180 are coupled network 160 to support communications between the application server, the location server, and other system components.

Building 140 is referred to as an 'enclosing location object' because being inside the building identifies the location of the mobile stations 110a and 110b with the enclosing location object. The term 'enclosing location object' does not imply that the location of the object is necessarily stationary. An enclosing location object may be stationary premises such as the building referred illustrated in FIG. 1, but as will be described later with reference to FIG. 2, the enclosing location object may be a vehicle or other movable platform that can carry or contain users with their mobile stations. Additionally, an enclosing location object need not enclose mobile stations within the interior of a structure so long as presence of the mobile stations at the enclosing location object establishes a correspondence between the location of the mobile stations and the locations of the enclosing location object.

Building 140 may be provided with one or more sensors 105a and 105b for detecting the presence of a mobile station or a detecting a user or other object associated with the mobile station. For example, sensor 105b can be a radio frequency identification (RFID) beacon located outside of building 140 near an entrance, while sensor 105a may be an RFID beacon located inside building 140 near the entrance. The beacons can detect a corresponding sensor on the person of the user associated with a mobile station and/or a corresponding sensor attached to or integrated with the mobile station. The use of RFID is merely exemplary and any other mechanism for detecting the presence of the user or the mobile station can be used. For example a communication device for receiving calls from mobile stations can be used as a sensor. When communications device receives a call from a mobile station, the communication device can use the received call as indication that the user is present with his mobile station.

When a user with a mobile station enters the building 140, the user may detected by sensor 105b. Upon leaving the building the user may be detected by sensor 105a. Alternatively or additionally, a single sensor can perform the functions of sensors 105a and 105b. Information from the sensors 105a and 105b is supplied to computer 115 associated with building 140. The sensors 105a and 105b may be coupled to the computer by any means that supports the transfer of sensor information to computer 115. In the illustration, sensor 105a is shown to be connected to computer 115 via local area network 120, while sensor 105b is shown to be in wireless communication with the computer 115. Wired or wireless connections can be employed with either sensor.

Local area network 120 couples together various components associated with building 140. While the connections to local area network 120 are illustrated as wired links, any of the connections to local area network may be made by a wireless link. The local area network is coupled to network 160 to support communications between building components and other system components.

Computer 115 executes routines that implement logic for performing various functions associated with the system. Computer 115 may be coupled via network 160 to allow communication with other system elements.

Figure 2:
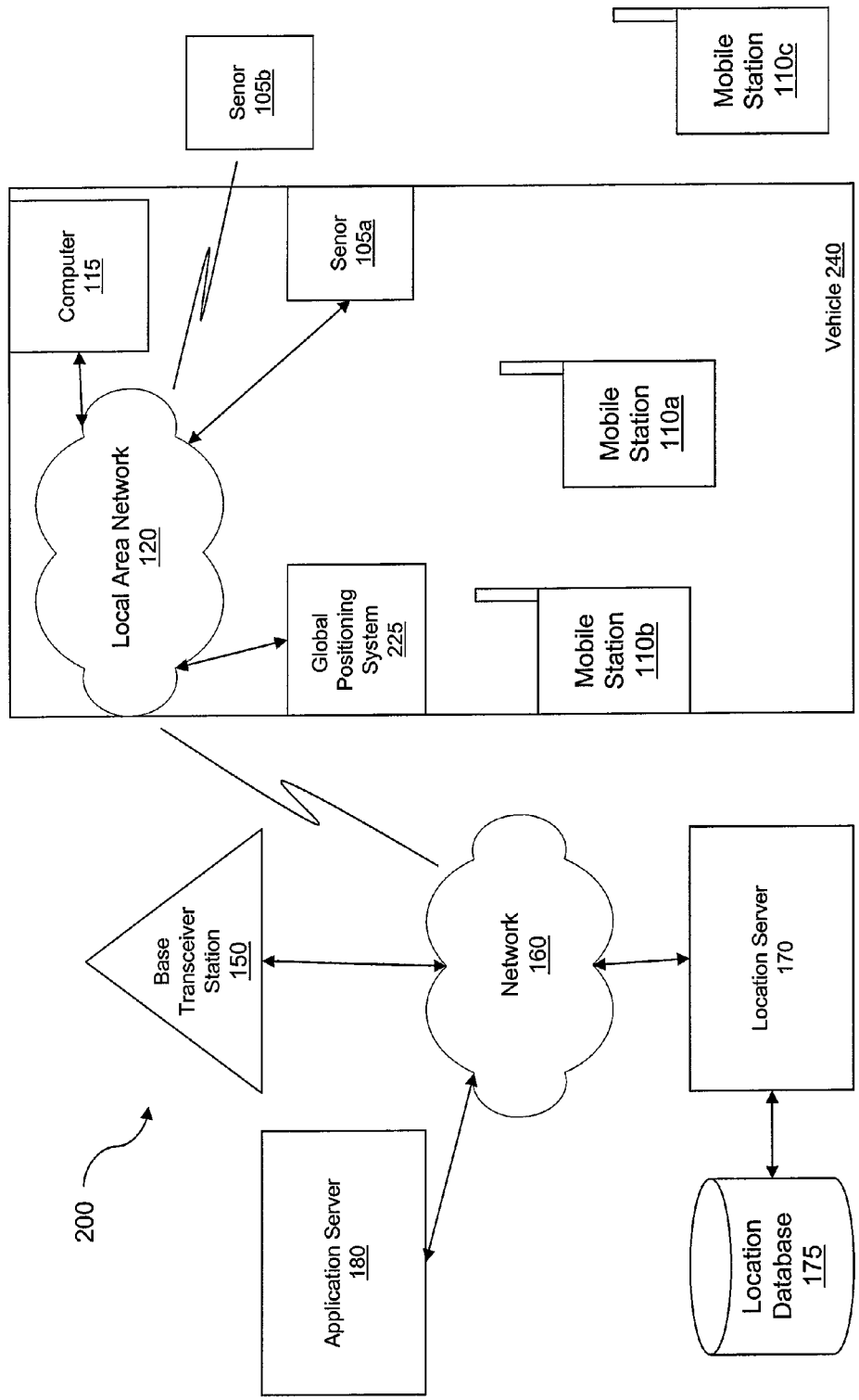
FIG. 2 is a block diagram of an exemplary location server system in accordance with the present invention.

FIG. 2 is a block diagram of another exemplary location server system 200 in accordance with the present invention. Components identical to those illustrated in FIG. 1 and performing identically are given the same reference numbers in FIG. 2. The detailed descriptions of components and their functions that are identical to those illustrated in FIG. 1 will be omitted.

Mobile stations 110a and 110b are located within vehicle 240, while mobile station 110c is outside of vehicle 240. The mobile stations 110a, 110b, and 110c are each in wireless communication with a base transceiver station 150. Vehicle 240 is a called an enclosing location object because establishing the location of the mobile stations as being within the vehicle also establishes the relative positions of mobile stations 110a and 110b as being at vehicle 240. However, because vehicle 240 is movable, the absolute position of the vehicle 240, expressed for example as terrestrial longitude and latitude, may change. As the vehicle moves, the absolute locations of mobile stations 110a and 110b change with the position of the vehicle 240. Vehicle 240 may be any movable platform capable of conveying the mobile stations 110a and 110b. For example, vehicle 240 may be a car, airplane, subway train, or other conveyance.

Vehicle 240 includes a location determining device 225 for determining the vehicle's absolute position. As illustrated in FIG. 2, the vehicle location determining device 225 may be a Global Positioning System (GPS). However, any location determining system that can determine the absolute location of the vehicle 240 can be used. For example, the vehicle positioning device may be a radio receiver that obtains information from a transponder that transmits a geographic location when the vehicle 240 comes within a close range of the transponder.

Figure 3:
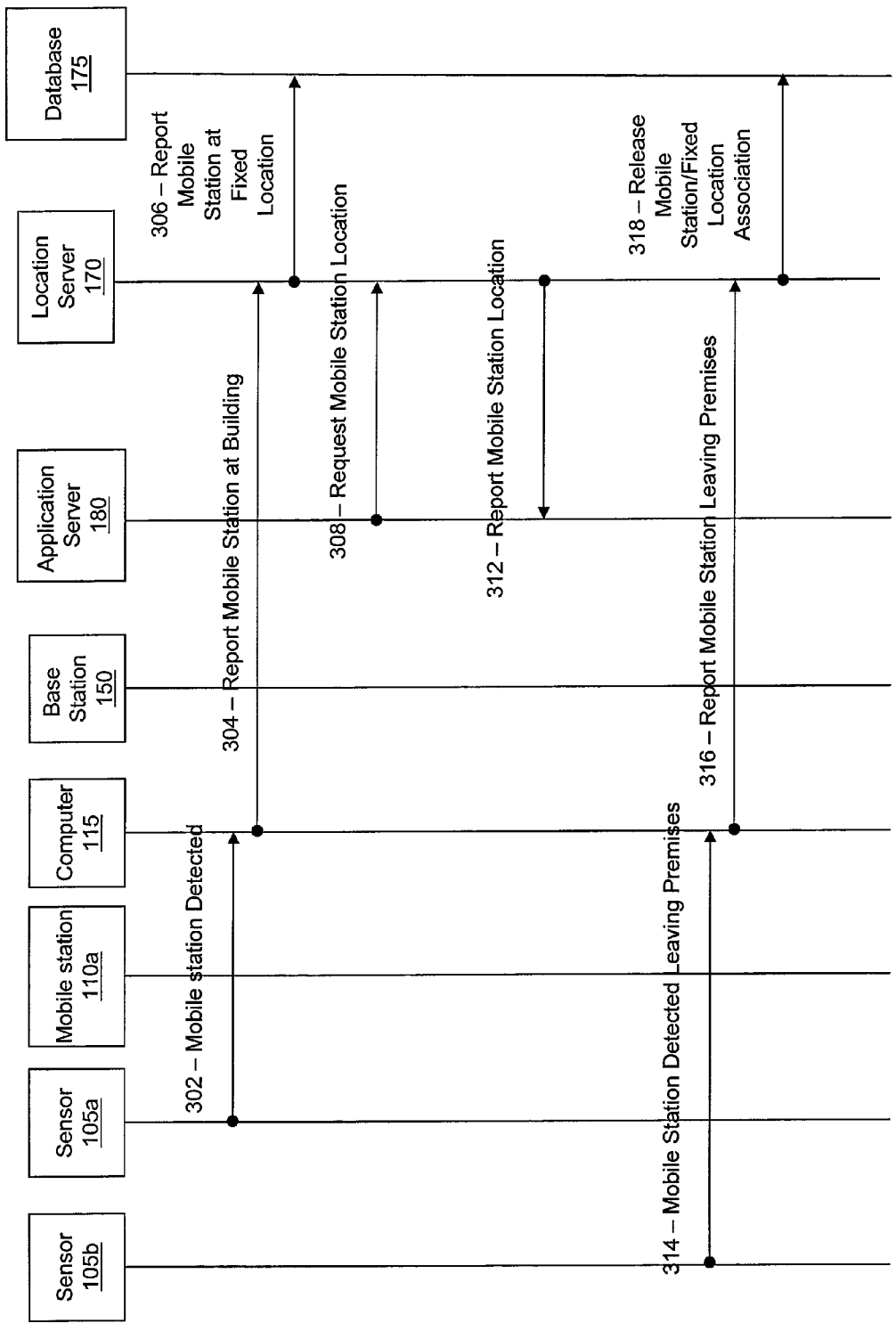
FIG. 3 is a message flow diagram illustrating an exemplary method in accordance with the present invention.

FIG. 3 is a message flow diagram that illustrates an exemplary method for providing location information in accordance with the invention.

Referring to FIGS. 1, 2, and 3, a method for providing location information for a mobile station according to the current invention may begin with an identification of the mobile station as being within or at an enclosing location object (step 302). For example, a sensor 105b located near the entrance of building 140 or vehicle 240 detects that a user with his mobile station entering the enclosing location object and transmits information identifying the user and the entry of the user into the enclosing location object to computer 115.

Upon receiving information from the sensor, computer 115 uses the sensor information to generate and transmit a message that indicates that the user is in the building 140 or vehicle 240 (step 304) under the control of logic implemented on the computer. The transmitted message includes information describing the enclosing location object and information identifying either the mobile station or the mobile station user. Computer 115 may contain logic that translates the identifier read from a sensor such as an RFID tag identifier, into an identifier for the mobile station or the user. The information describing the enclosing location object can include location information such as longitude and latitude, or address information such as street name, city and state, and facility name and/or other identifier. The information describing the enclosing location object can also include an indication of whether the enclosing location object is a stationary location (for example, building 140) or a movable location (for example, vehicle 240). The message information is transmitted over network 160 to the location server 170.

Computer 115 can transmit the message immediately after determining that the user is at the enclosing location object. Alternatively, the computer 115 can store the information regarding the user in local memory, and transmit the message indicating that the user is in the building according to a schedule, or in response to a received request from another system component such as the location server 170, or the application server 180.

The location server 170 receives the message transmitted by the enclosing location object (building 140 or vehicle 240) and forwards the message to location server 170 (step 306) which stores a correlation in the locations server database 175 indicating that the mobile station is at the location of the enclosing location object, under the direction of logic on the location server 170 and the location server database 175. The correlation may be stored in the database in any fashion that allows later retrieval of the correlation between the enclosing location object and the mobile station from the location server database 175. For example, the location information may be stored as records in a single table, wherein each record in the table includes separate fields for information identifying a specific location server, for information identifying the enclosing location object as stationary or movable, and for identifying the mobile station or a mobile station subscriber associated with the mobile station. In populating a record of the location server database 175, the location server 170 may use information in the received message to retrieve previously stored information related to the enclosing location object, the mobile station, or the subscriber of the mobile station. The location server may convert the information to a desired format before storing the information in the location server database 175.

FIG. 6 illustrates an example database table for storing the location correlation on the local server. Database table 600 includes a plurality of records (601-604) each storing a correlation of information for a mobile station with information describing the enclosing location object. Each of the records 601-604 includes a plurality of fields 605-630 that contain data for use with embodiments of the invention. In the illustrated embodiment, each record includes a field 605 indicating whether the record is active or inactive. Fields 610-620 contain information describing the enclosing location object, where field 610 contains the enclosing location object identifier, field 615 contains information describing the enclosing location object type, and field 620 contains information identifying the geographic location of the enclosing location object. Fields 625 and 630 contain information related to the mobile station. In the table 600, field 625 contains a mobile station identifier. For records 601, 602, and 604 the mobile station identifier in field 625 is the IMSI for a mobile phone, while for record 604, the mobile identifier is the IMEI for a mobile phone. Field 630 contains an opt-in field indicating whether the user of the mobile station has opted-in or opted-out to providing location information upon request. Table 600 may contain additional fields for performing functions related to the invention or for performing unrelated functions. For example, the table may contain a time stamp field indicating the time and date of creation of a record. The time stamp field can be used to identify stale records for removal from table 600.

While FIG. 6 shows table 600 as a single database table in which individual records store correlation information, the information in table 600 need not be stored in a single physical table in the location server database 175. The records and physical fields composing the table 600 may be stored in a distributed fashion occupying multiple physical storage locations. For example, storage of the correlation information may be organized into a plurality of tables of a relational database and retrieved as a table or an individual record as shown in FIG. 6 in response to a query on the relational database.

Returning to FIGS. 1-3, an application executing on the application server 180 may transmit a request for the location of mobile station (step 308). The request for the location of mobile station 110a includes a unique mobile station identifier associated with mobile station 110a. The request can be sent to the location server in response to a request sent to application server 180 (e.g. from another mobile station and/or server), or the request can be based upon a need for the information by an application being executed on the application server 180.

Upon receipt of the request, the location server 170 determines if the mobile station 110a is at the enclosing location object. In making this determination, the location server 170 can perform the method illustrated in FIG. 4.

Figure 4:
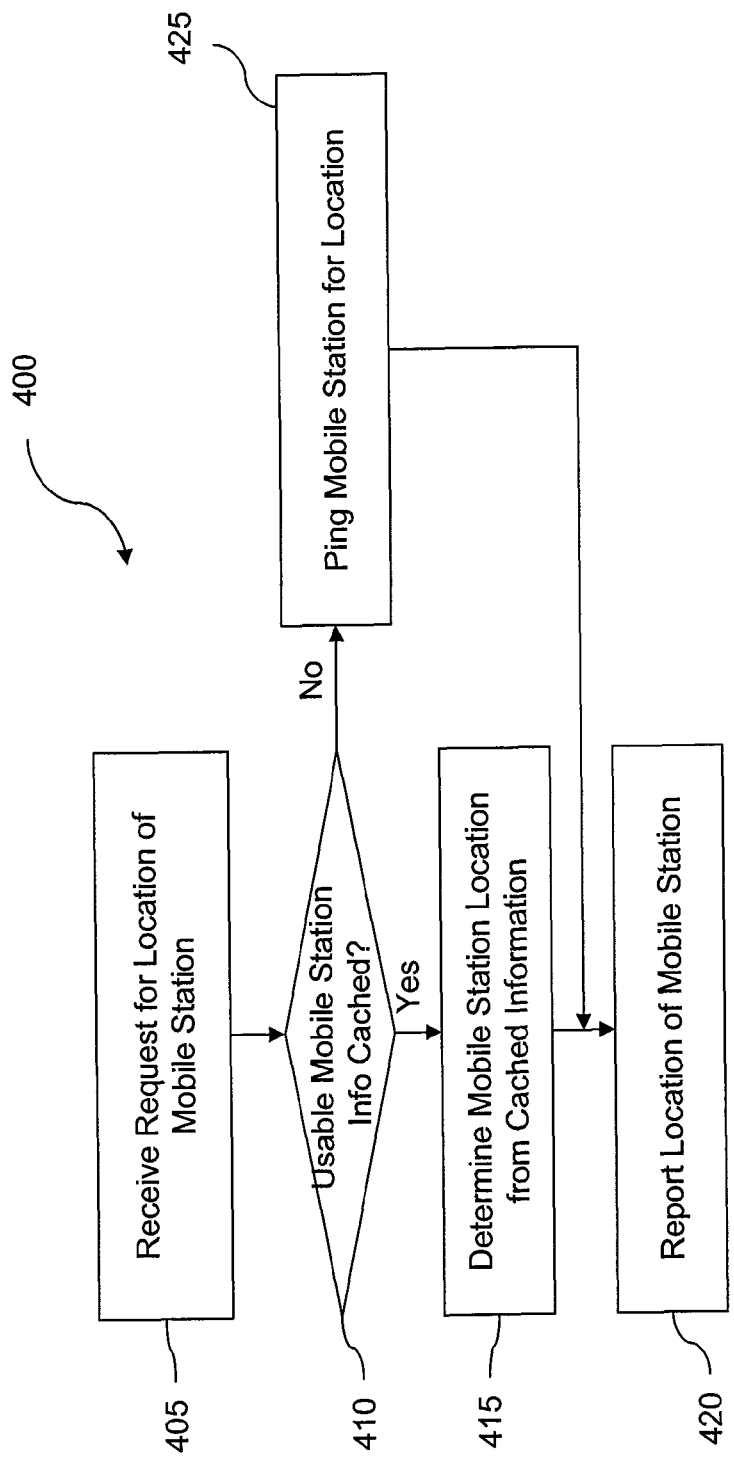
FIG. 4 is a flowchart illustrating an exemplary method in accordance with the present invention.

FIG. 4 illustrates a process that may be conducted by under the control of logic implemented on the location server 170 and/or the location server database 175. Process 400 begins with receipt of the request for the location of the mobile station from the application server 180 (step 405). Under control of logic implemented on the location server 170 and/or the location server database 175, the location server 170 then searches the correlation information table 600 in the location server database using the mobile station identification information to determine whether the location server database 175 contains a usable correlation between the mobile station and an enclosing location object (step 410).

If the search produces a record in the location information table that corresponds to the mobile station identifier, the location server 170 makes a determination that the mobile station information is found in the database. For example, if the location server 170 receives a request for the mobile station having an IMSI of '100000000000001' then upon finding record 601 by searching the table 600 for records containing the IMSI value in the mobile station identifier field 625, the location server 170 may determine that the location server database 175 contains a correlation of the mobile station and an enclosing location object. The location server 170 may presume that the record is usable simply based on locating the record in the location server database 175. Alternatively, after locating the record corresponding to the mobile station identifier, the location server 170 may evaluate a field 605 in the record indicating whether the record is "active" or "inactive". When the information in field 605 indicates that the record is inactive, the server may make the determination that the location server 170 does not contain a usable correlation of the mobile station and an enclosing location object despite the presence of a record containing the mobile station identifier in field 625. Finally, the location server 170 may review information in the Opt-in field 630 to determine if the mobile station's subscriber has agreed to provide location information on request. If the opt-in field 630 indicates "yes" as shown for records 601, 602, and 604, the location server 170 may make the determination that the location server database 175 holds a usable correlation of the mobile station and the enclosing location object. On the other hand, if the received request had included an IMSI of '100000000000003' as the mobile station identifier, the location server search would retrieve record 604. Based on the 'No' value in field 630 of record 604, the location server 170 would determine that the location server database 175 did not contain a usable correlation between the mobile station and an enclosing location object despite the fact that the record contained a 'Yes' value in filed 605 indicating that the record 604 was 'Active'.

In response to the determination that the location server database 175 does not contain a usable correlation, the location process may optionally proceed (step 425) to determine the location of the mobile station using an alternative method. For example, the mobile station may transmit a 'ping' to the mobile station via network 160 and base transceiver station 150 so that the mobile station can determine and provide the mobile station's location. The location server 170 may implement logic that prevents transmission of the ping when field 630 of the record retrieved at step 410 indicates that the mobile station's subscriber has either not agreed or has explicitly refused to provide location information.

Upon a determination that the location server database 175 contains a usable correlation of the mobile station and an enclosing location object (the 'Yes' path out of decision step 410) the location server 170 uses the retrieved correlation information to determine the location of the enclosing location object (step 415) and then reports the location of the mobile station (step 420). In determining the location of the enclosing location object, the location server 170 can execute the process illustrated in FIG. 5.

Figure 5:
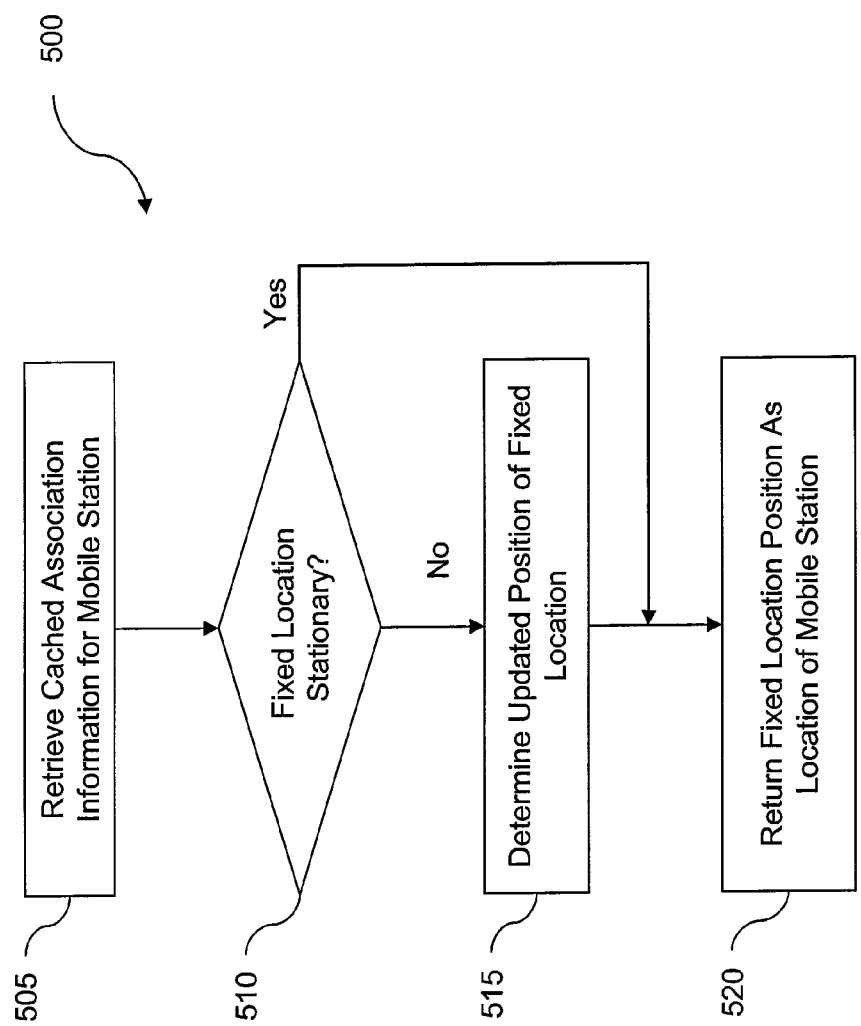
FIG. 5 is a flowchart illustrating an exemplary method in accordance with the present invention.

FIG. 5 illustrates a process that may be executed by logic on the location server 170 to determine the location of a mobile station independently of sending a location request to the mobile station.

Initially, the location server 170 retrieves a record from the location server database 175 that includes usable correlation information between the mobile station and an enclosing location object (step 505). The location server 170 then determines whether the enclosing location object described in the correlation table is stationary or movable using information contained in the retrieved record (step 510).

In making the determination of whether the enclosing location object is stationary or movable, the location server 170 may use information contained in field 615 of table 600 containing a description of the enclosing location object type. Field 615 contains information describing the type of enclosing location object. For example, when the value of field 615 is 'Building' or 'Stationary' as in records 601 and 604 respectively, the location server 170 may determine that the enclosing location object is a stationary location. On other hand, when the value of field 615 is 'Bus' or 'Air Flight' as illustrated for records 602 and 603, respectively, or otherwise indicates that the enclosing location object corresponds to a vehicle or other movable conveyance, the location server 170 may determine that the enclosing location object is movable.

Alternatively, the location server 170 may determine whether the retrieved record corresponds to a stationary or movable location by examining a field describing the position of the enclosing location object such as field 620.

Field 620 of table 600 contains information describing the position of the enclosing location object. The position information for the enclosing location object is defined independent of geographical areas defined for operation of a wireless communication network. In other words, the position information is not defined on a cell or sector basis. When field 620 for the usable record is empty as is the case for record 603 or contains the value 'Movable' as does record 602, the location server 170 may use the information to conclude that the movable location is movable ('No' path out of decision block 510).

Accordingly, the location server 170 determines an updated position for use as the location of the mobile station (step 515). The location server 170 can determine the updated position by querying the enclosing location object for its current location. Alternatively, the location server 170 can receive updated positions periodically transmitted from a movable enclosing location object. As yet another further alternative, the location server 170 may retrieve information from the location server database 175 describing the speed and direction of travel of the enclosing location object, a previous location for the enclosing location object and a time associated with the previous location, and may the retrieved values to calculate an estimated position for the enclosing location object. Depending upon the enclosing location object type and other information describing the information server, the location server 170 may implement logic to determine whether to use a calculated position for the enclosing location object, to utilize a periodically supplied position transmitted by the enclosing location object, or to request the current position directly from the enclosing location object. Once a position for the enclosing location object is obtained, the process then continues at step 520.

On the other hand, when field 620 contains information indicating a stationary position for the enclosing location object ('Yes' path out of decision block 510), the location server 170 may determine that the enclosing location object is stationary based on the value in field 620. For example, field 620 of record 601 contains the longitude and latitude of the Chrysler Building, while field 620 of record 604 contains the street address for Penn Central Station in Michigan. The location server 170 may determine based on the provision of a fixed position in field 620 that the enclosing location object is stationary.

The location may employ other information in determining whether the enclosing location object is stationary. For example, location server database table 600 may contain fields containing a speed and direction of travel for the enclosing location object. When the speed information indicates a non-zero value, the location server 170 may make the determination that the usable record corresponds to a movable enclosing location object, while a zero value for speed indicates that the enclosing location object is stationary.

When the location server 170 determines that the enclosing location object is not movable, but is stationary, location information from field 620 of the table is used as the location for the enclosing location object and the process proceeds along the 'Yes' branch from decision block 510 to continue at step 520.

At step 520, the location server 170 generates a message for reporting the location of the enclosing location object as the location of the mobile station. The generated message is obtained independently of (i.e. without) a request for location information being sent to the mobile station. Accordingly, the process shown in FIG. 5 can be used even when the mobile station is turned off or otherwise placed in a state in which the mobile station does not transmit and/or receive mobile communications.

After the mobile station's location is determined from cache information (step 415) or from a ping (step 425), execution of the method terminates at step 420 with a report of the location of the mobile station to the application server 180.

Referring again to FIGS. 1, 2, and 3, the location server 170 transmits a message containing the position information of the mobile station to the application server 180 (step 312). The message contains the mobile station identifier that was provided to the location server 170 with the request at step 308 and location information for the mobile station. The location information provided in the message is the information determined for the enclosing location object such as the building 140 or the vehicle 240. Either the application server 180 or the location server 170 may include routines for converting location information from one format to another. The location server 170 may chose a location information format based on information in the request received at step 308, or may output the information in a fixed format. Upon receiving message containing the location information for the mobile station, the application server 180 uses information in the message to generate location customized information using logic implemented on the application server.

As described above, the location server 170 adds entries to a table, such as table 600 that stores correlations between the mobile stations and information relating to enclosing location objects thereby updating the location server database 175. The location server database 175 can also be updated to indicate disassociations of mobile stations with an enclosing location object. For example, the location server database 175 can be updated when a user leaves an enclosing location object with his mobile station.

Referring again to FIGS. 1, 2, and 3, a sensor (sensor 105a or 105b) can detect that a user has exited an enclosing location object such as a building 140 or a vehicle 240. The sensor can then transfer information including an identifier correlated with the user to the computer (step 314). Logic in the computer determines that a mobile station user has left the building, and in response to the determination, the computer generates and transmits a message indicating a disassociation of the mobile station with the enclosing location object (step 316). The disassociation message contains an identifier for the mobile station and description information for the enclosing location object. The mobile station identifier and the description information for the enclosing location object contained in the dissociation message may be similar to the information in the message described above for step 304 for indicating that a user has entered the building.

Upon receiving a disassociation message from an enclosing location object, the location server 170 then updates the location server database 175 to reflect the fact that the mobile station is no longer at the enclosing location object. The location server 170 can update the location server database 175 by locating a record containing an association of the mobile station with the enclosing location object and removing the located record from table 600, or alternatively by updating a field (e.g. filed 605) in the located record to indicate the correlation is inactive. Alternatively, the location server 170 can simply clear information relating to the enclosing location object from the located record.

If upon receiving a dissociation message, the location server 170 determines that table 600 does not contain a location record, the location server 170 can allow the table to remain in the current condition. Alternatively, the location server 170 can create a record having an 'Active' record field (e.g. field 605) that indicates that the record is inactive.

In the above description, the computer the location server, location server database, and the application server have been described as carrying out processes and methods, and as performing functions such as making determinations, storing information, and generating, transmitting and receiving messages and implementing logic. For the purpose of performing these and other operations, the location server, application server, computer, and location server database may include processors such as a microprocessor for executing instructions. Each of the included computers has a processor that executes instructions retrieved from a computer readable memory that cause the computers to carry out the relevant operations. The computer-readable computer readable memory may include a hard drive, random access memory (RAM), read only memory (ROM), or other memory accessible by the processor.

Alternatively, operations described above can be implemented in hardware using electrical circuitry arranged as logic for carrying out the described operations. A combination of hardware and computers with computer readable instructions can be used to carry out the described operations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing location information, the method comprising:
   receiving at a location server a message from a computer associated with an enclosing location object comprising an output from a sensor associated with the enclosing location object arranged to detect that a mobile station is present at the enclosing location object;
   updating at a first time a database by the location server based on the received message with correlation information that identifies in the database that the mobile station is present at the enclosing location object associated with the computer and the sensor;
   receiving at a second time by a location server a request for location information for the mobile station;
   determining based on the correlation information that the correlation information is active to determine the requested location information of the mobile station; and
   upon a determination that the correlation information is active, generating location information that provides a location of the enclosing location object as location information for the mobile station.

2. The method of claim 1, further comprising transmitting the generated location information for the mobile station.

3. The method of claim 1, wherein the sensor is a radio frequency identification (RFID) beacon.

4. The method of claim 1, wherein updating the database with correlation information includes:
   receiving information generated by a sensor that detects a presence of a mobile station; and
   generating a correlation between an identifier for the detected mobile station included in the request, and information describing the location of an enclosing location object associated with the sensor, and storing the correlation in the database.

5. The method of claim 1, further comprising:
receiving second information based on a sensor output indicating a dissociation of a mobile station from the enclosing location object; and
updating the database to indicate the dissociation.

6. The method of claim 5, wherein updating the database to indicate the dissociation includes modifying a correlation in the database between the identifier for the mobile station and information describing the location of the enclosing location object to indicate that the mobile station is not at the enclosing location object.

7. The method of claim 1, wherein determining the location of the enclosing location object comprises:
determining that the enclosing location object is stationary using information stored in the database; and
retrieving the location information for the enclosing location object stored in the database.

8. The method of claim 1, further comprising wherein determining the location of the enclosing location object comprises:
determining that the enclosing location object is movable using information stored in the database;
determining an updated location information for the enclosing location object in response to the determination that the enclosing location object is movable; and
generating location information that correlates the updated location information for the enclosing location object and the identifier for the mobile station.

9. The method of claim 8, wherein determining an updated location information for the enclosing location object comprises:
determining the current position of the enclosing location object using a global positioning system at the enclosing location object.

10. The method of claim 8, wherein determining an updated location information for the enclosing location object comprises:
calculating the updated location using a previous position for the enclosing location object retrieved from the database and a time stamp associated with the previous position.

11. A method of providing location information, the method comprising:
detecting at a computer of an enclosed location object a presence of a mobile station using a sensor at an enclosing location object;
storing in a memory of the computer of the enclosing location object information that identifies the mobile station as being at the enclosing location object; and
transmitting from the computer of the enclosed location object a command that stores at a location server a correlation of an identifier for the mobile station and information describing the enclosing location object at a location server;
receiving at the computer of the enclosing location object a request for mobile station location information from a location server; and
providing information identifying the mobile station as being present at the enclosing location object and the identifier of the mobile station to the location server in response to the request.

12. The method claim 11, further comprising:
transmitting information indicating a disassociation of the mobile station from the enclosing location object in response to a determination that the mobile station is not at the enclosing location object.

13. The method of claim 11, further comprising:
detecting using a sensor that the mobile station is disassociated with the enclosing location object; and
transmitting a message that updates the location server to reflect the disassociation.

14. A method of providing location information, the method comprising:
receiving by a location server a request for location information for a mobile station, the request including an identifier for the mobile station; and
determining based on correlation information in a location server database whether the mobile station is at an enclosing location object in response to the request,
wherein when it is determined that the mobile station is at the enclosing location object,
obtaining the enclosing location object from the location server database independent of a location request being sent to the mobile station;
providing the enclosing location object to a requestor of the location information, wherein the enclosing location object is defined independently of geographical areas defined for operation of a wireless communication network;
determining that the enclosing location object is movable using the correlation information;
determining updated location information for the enclosing location object in response to the determination that the enclosing location object is movable; and
generating location information that correlates the updated location information and the identifier for the mobile station.

15. The method of claim 14, further comprising:
updating the database with information based on output from a sensor that detects the presence of a mobile station an enclosing location object associated with the sensor.

16. The method of claim 14, further comprising:
detecting using a sensor that a mobile station is disassociated with the enclosing location object; and
updating the database to reflect the disassociation.

17. The method of claim 14, wherein determining updated location information for the enclosing location object comprises:
transmitting a request to the enclosing location object for location information.

18. The method of claim 14, wherein determining updated location information for the enclosing location object comprises:
calculating the updated location using information retrieved from the database.

* * * * *